US012602146B2

(12) United States Patent
Uehara

(10) Patent No.: US 12,602,146 B2
(45) Date of Patent: Apr. 14, 2026

(54) ASSEMBLY FABRICATION ASSISTING METHOD, ASSEMBLY FABRICATION ASSISTING SYSTEM, AND NON-TRANSITORY COMPUTER-READABLE MEDIUM

(71) Applicant: EXEDY Corporation, Neyagawa (JP)

(72) Inventor: Yoshihito Uehara, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 238 days.

(21) Appl. No.: 18/454,134

(22) Filed: Aug. 23, 2023

(65) Prior Publication Data

US 2024/0103700 A1　Mar. 28, 2024

(51) Int. Cl.
　　*G06F 3/04842*　　(2022.01)
　　*G06F 3/0482*　　(2013.01)
　　*G06F 9/451*　　(2018.01)
(52) U.S. Cl.
　　CPC ........ *G06F 3/04842* (2013.01); *G06F 3/0482* (2013.01); *G06F 9/451* (2018.02)
(58) Field of Classification Search
　　CPC .... G06F 3/04842; G06F 3/0482; G06F 9/451; G06Q 10/103; G06Q 30/015; G06Q 30/0281; G06Q 30/0603; G06Q 30/0613
　　See application file for complete search history.

(56) References Cited

U.S. PATENT DOCUMENTS

| | | | | |
|---|---|---|---|---|
| 9,815,118 | B1 * | 11/2017 | Schmitt | ..................... B22F 7/02 |
| 11,138,798 | B2 * | 10/2021 | Paul | ........................ G06F 3/013 |
| 11,353,856 | B2 * | 6/2022 | Rudnitsky | .......... G05B 19/4097 |
| 2012/0123707 | A1 * | 5/2012 | Bucher | .................. G01B 11/24 |
| | | | | 702/55 |
| 2021/0287451 | A1 * | 9/2021 | Baudisch | ................ G06T 19/20 |
| 2024/0280954 | A1 * | 8/2024 | Krishnan | ............. G05B 19/182 |

FOREIGN PATENT DOCUMENTS

JP　　　　　3220922 U　　4/2019

* cited by examiner

*Primary Examiner* — Cao H Nguyen

(74) *Attorney, Agent, or Firm* — United IP Counselors, LLC

(57) ABSTRACT

An assembly fabrication assisting method includes the steps of causing a user terminal to display a plurality of assemblies, receiving from a user which one has been selected by the user from the plurality of assemblies, and causing the user terminal to display a sample image of the one selected from the plurality of assemblies and an input screen for dimensions of the one selected from the plurality of assemblies.

12 Claims, 12 Drawing Sheets

CONTROL PART

FIRST DISPLAY CONTROL PORTION ~331

SECOND DISPLAY CONTROL PORTION ~332

MODIFICATION PORTION ~333

MATERIAL CUTOUT LAYOUT GENERATING PORTION ~334

PROPOSAL PORTION ~335

EDITING PORTION ~336

ASSEMBLY FABRICATION ASSISTING METHOD, ASSEMBLY FABRICATION ASSISTING SYSTEM, AND NON-TRANSITORY COMPUTER-READABLE MEDIUM

CROSS-REFERENCE TO RELATED APPLICATIONS

This application is based on and claims the priority benefit of Japanese application 2022-151766 filed on Sep. 22, 2022, the contents of which are incorporated herein by reference.

TECHNICAL FIELD

The claimed invention relates to an assembly fabrication assisting method, an assembly fabrication assisting system, and a non-transitory computer-readable medium.

BACKGROUND

In recent years, DIY (Do-It-Yourself) based fabrication has been widely used for making assemblies such as furniture. Specifically, a customer purchases material such as a piece of wood in a retail store such as a home improvement store, and then cuts the material for oneself or uses a service of cutting the material in the retail store selling the material. Thereafter, the customer fabricates an assembly by assembling members, obtained by cutting the material, with screws and/or so forth.

Publication of Japanese Registered Utility Model No. 3220922 proposes a system for reducing a waiting time required for a customer in ordering a service of cutting a material into members in a retail store such as a home improvement store by enabling the customer to preliminarily order the cutting service over the Internet, and then receive the cut members at the retail store after completion of cutting of the material.

However, in the first place, designing an assembly is difficult for those who are not used to DIY. In view of this, it is an object of the claimed invention to easily design an assembly.

SUMMARY OF THE INVENTION

An assembly fabrication assisting method according to a first aspect relates to an assembly fabrication assisting method executed by a computer. The assembly fabrication assisting method includes causing a user terminal to display a plurality of assemblies, receiving which one has been selected from the plurality of assemblies by a user, and causing the user terminal to display a sample image of the one selected from the plurality of assemblies and an input screen for dimensions of the one selected from the plurality of assemblies. According to the method, it is only required for the user to input the dimensions into the input screen, because the sample image has been already prepared; hence, it is made possible to easily design the assembly.

An assembly fabrication assisting method according to a second aspect relates to the assembly fabrication assisting method according to the first aspect and further includes modifying the sample image displayed on the user terminal based on an input value inputted into the input screen. According to the method, it is made possible for the user to intuitively design the assembly.

An assembly fabrication assisting method according to a third aspect relates to the assembly fabrication assisting method according to the first or second aspect and further includes generating a material cutout layout based on an input value inputted into the input screen and causing the user terminal to display the material cutout layout. According to the method, it is not required for the user to create the material cutout layout for oneself; hence, it is made possible to design the assembly more easily.

An assembly fabrication assisting method according to a fourth aspect relates to the assembly fabrication assisting method according to the third aspect and further includes receiving an edit made by the user for the material cutout layout. According to the method, it is made possible to obtain a desired surplus member.

An assembly fabrication assisting method according to a fifth aspect relates to the assembly fabrication assisting method according to the third or fourth aspect and further includes receiving an operation performed by the user for setting a surplus member region in the material cutout layout and modifying the input value based on the surplus member region. According to the method, it is made possible to easily obtain the desired surplus member.

An assembly fabrication assisting method according to a sixth aspect relates to the assembly fabrication assisting method according to the fifth aspect and further includes receiving a request made by the user to modify a plurality of input values including the input value. Modifying the input value is executed to modify the input value in response to the request made by the user.

An assembly fabrication assisting method according to a seventh aspect relates to the assembly fabrication assisting method according to any of the first to sixth aspects. In the method, when the one selected from the plurality of assemblies by the user includes an accommodation part, the input screen includes a selection button for selecting either a standard of internal dimension or a standard of external dimension.

An assembly fabrication assisting method according to an eighth aspect relates to the assembly fabrication assisting method according to any of the first to seventh aspects and further includes calculating an amount of paint in accordance with an area of painting and causing the user terminal to display the amount of paint.

An assembly fabrication assisting method according to a ninth aspect relates to the assembly fabrication assisting method according to any of the first to eighth aspects and further includes transmitting to the user terminal a manual regarding a method of fabricating the one selected from the plurality of assemblies by the user.

An assembly fabrication assisting method according to a tenth aspect relates to the assembly fabrication assisting method according to any of the first to ninth aspects and further includes calculating a total weight of members required to fabricate the one selected from the plurality of assemblies by the user and notifying the user terminal of the total weight.

An assembly fabrication assisting method according to an eleventh aspect relates to the assembly fabrication assisting method according to any of the first to tenth aspects and further includes transmitting data regarding a material cutout layout to a terminal belonging to a processing business operator and transmitting a notification indicating completion of cutting of members required to fabricate the one selected from the plurality of assemblies by the user to the user terminal in response to reception of the notification.

A non-transitory computer-readable medium including a program according to a twelfth aspect causes a computer to execute the assembly fabrication assisting method recited in any of the first to eleventh aspects.

An assembly fabrication assisting system according to a thirteenth aspect includes a first display control portion and a second display control portion. The first display control portion causes a user terminal to display a plurality of assemblies. The second display control portion causes the user terminal to display a sample image of one selected from the plurality of assemblies by a user and an input screen for dimensions of the one selected from the plurality of assemblies.

Overall, according to the claimed invention, it is made possible to easily design an assembly.

BRIEF DESCRIPTION OF THE DRAWINGS

FIG. 7 is a diagram showing respective members.

DETAILED DESCRIPTION

An assembly fabrication assisting method, an assembly fabrication assisting system, and a non-transitory computer-readable medium according to a presently preferred embodiment will be hereinafter explained with reference to drawings. It should be noted that the term "assembly" refers to a unit obtained by combination of a plurality of members and encompasses furniture, a pergola, a doghouse, a bike shelter, a car overnight bed, a car interior storage rack, and so forth.

Assembly Fabrication Assisting System

Figure 1:
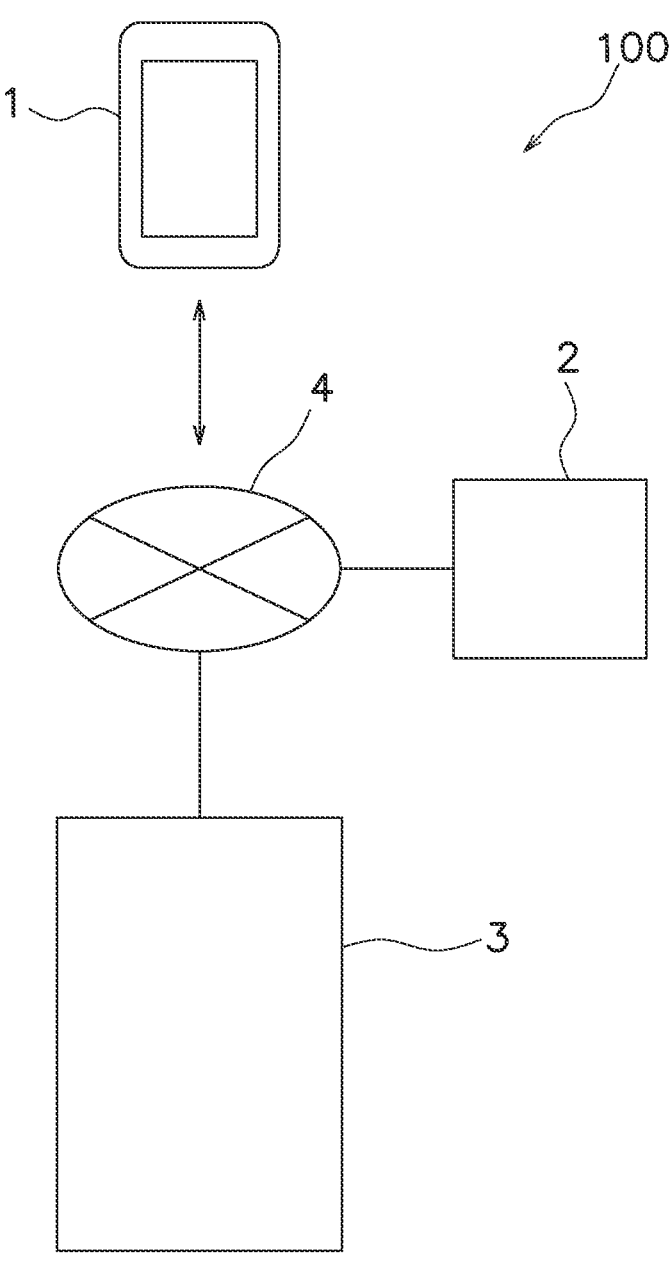
FIG. 1 is a block diagram showing a configuration of an assembly fabrication assisting system.

FIG. 1 is a block diagram showing a configuration of an assembly fabrication assisting system. As shown in FIG. 1, an assembly fabrication assisting system 100 includes a user terminal 1, a processing business operator terminal 2, and a server 3. The user terminal 1, the processing business operator terminal 2, and the server 3 are connected to each other over a network 4 (e.g., the Internet) so as to be able to communicate electronically with each other. The assembly fabrication assisting system 100 assists cutting out a plurality of members from at least one sheet of material and fabricating an assembly with the cutout members.

User Terminal and Processing Business Operator Terminal

Each of the user terminal 1 and the processing business operator terminal 2 may, for instance, be a smartphone, a tablet terminal, a personal computer, or so forth.

Figure 2:
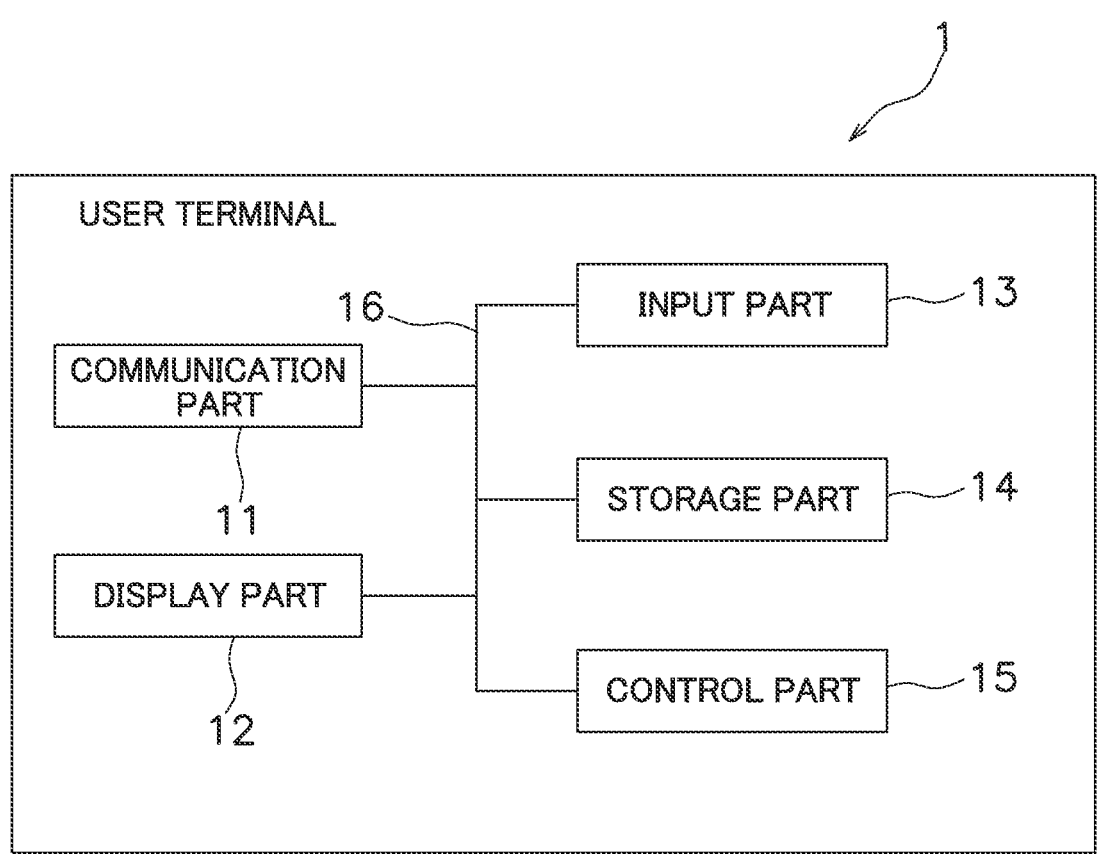
FIG. 2 is a block diagram showing a configuration of a user terminal.

FIG. 2 is a block diagram showing a hardware configuration of the user terminal 1. As shown in FIG. 2, the user terminal 1 includes a communication part 11, a display part 12, an input part 13, a storage part 14, and a control part 15. The communication part 11, the display part 12, the input part 13, the storage part 14, and the control part 15 are able to communicate with each other through bus cables 16.

The communication part 11 not only enables audio communication with another telephone over a cellular telecommunication network and data communication with a variety of servers (including the server 3) over the network 4 but also enables communication with another information terminal through a cable provided exclusively for the communication.

The display part 12 is an image display device such as an LCD (Liquid Crystal Display), an organic EL (Electro Luminescence) display, or a CRT (Cathode Ray Tube) display. The display part 12 displays a sample image, an input screen, and so forth (to be described) for a user.

The input part 13 is composed of a touch screen, a keyboard, a pointing device (e.g., a mouse, a tablet, etc.), an operating button, and/or so forth. The input part 13 receives an operation inputted by the user.

The storage part 14 is composed of at least one of an HDD (Hard Disk Drive), an SSD (Solid State Drive), a mask ROM (Read Only Memory), an EPROM (Erasable Programmable Read Only Memory), an EEPROM (Electrically Erasable Programmable Read Only Memory), and so forth.

The control part 15 is composed of a processor such as a CPU (Central Processing Unit) or a GPU (Graphics Processing Unit), one or more memories, and so forth. The control part 15 reads out programs stored in the storage part 14 and executes the programs.

The processing business operator terminal 2 can be configured in comparable manner to the user terminal 1 described above; hence, detailed explanation thereof will be omitted. It should be noted that the term "processing business operator" refers to, for instance, a home improvement store or so forth.

Server

Figure 3:
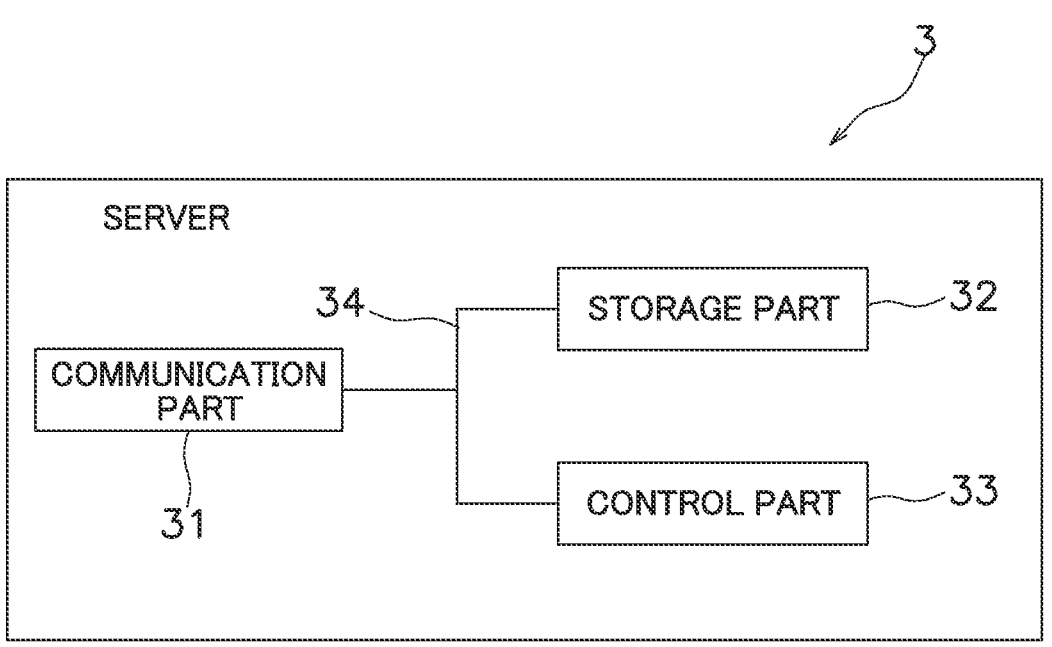
FIG. 3 is a block diagram showing a configuration of a server.

The server 3 is an application server in which programs for assisting assembly fabrication have been installed. FIG. 3 is a block diagram showing a hardware configuration of the server 3. As shown in FIG. 3, the server 3 includes a communication part 31, a storage part 32, and a control part 33. The communication part 31, the storage part 32, and the control part 33 are communicable to each other through buss cables 34.

The communication part 31 is a communication interface that establishes communication with the user terminal 1 and the processing business operator terminal 2 over the network 4.

The storage part 32 has stored programs, assembly information, input screen information, and so forth. The assembly information includes information regarding names of a plurality of types of assemblies and information regarding sample images of the assemblies. The input screen information includes information regarding input screens associated with the assemblies on a one-to-one correspondence. It should be noted that, as described below, each input screen is a screen for inputting dimensions of each assembly. The storage part 32 is composed of, for instance, at least one of an HDD, an SSD, a mask ROM, an EPROM, an EEPROM, and so forth.

Figure 4:
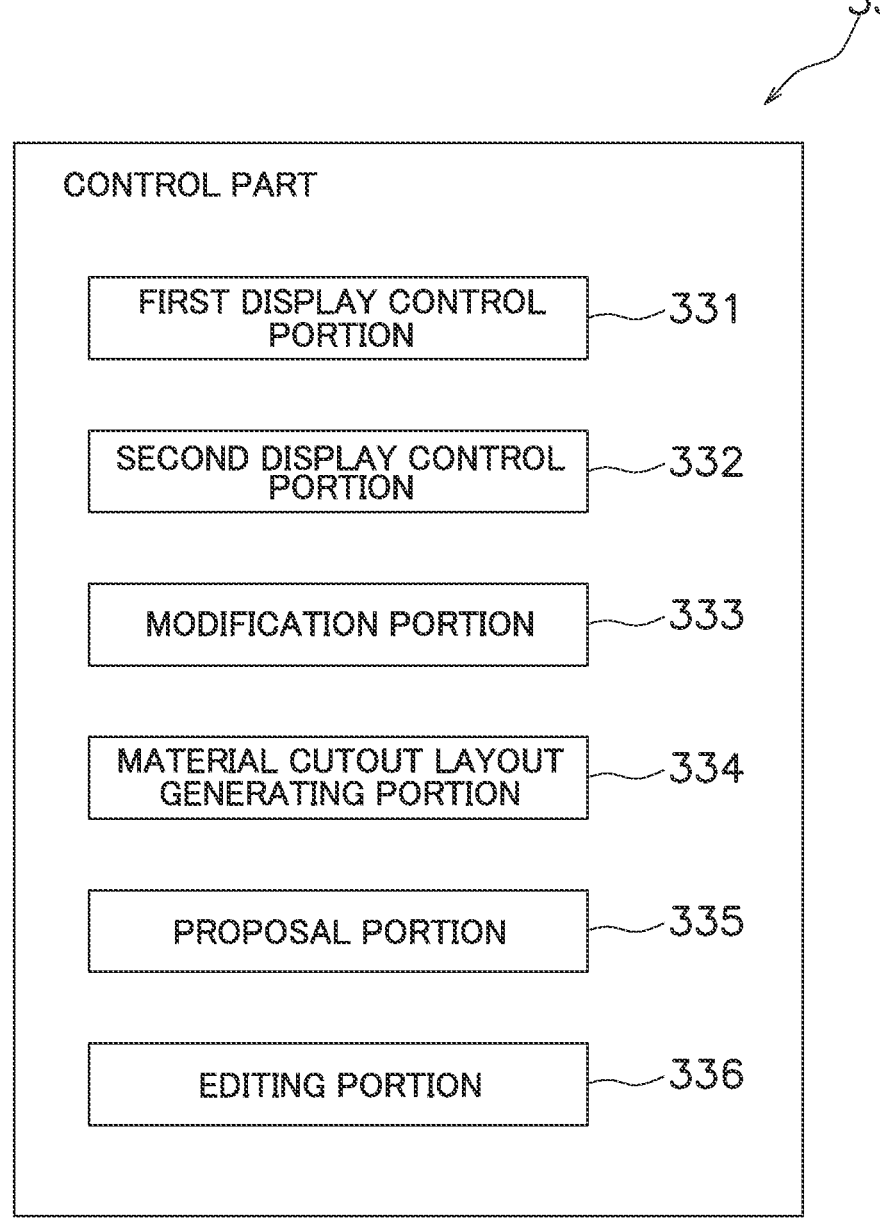
FIG. 4 is a block diagram showing a functional configuration of a control part of the server.

The control part 33 is composed of a processor such as a CPU or a GPU, one or more memories, and so forth. FIG. 4 is a block diagram showing a functional configuration of the server 3. As shown in FIG. 4, the control part 33 executes the programs stored in the storage part 32 so as to realize functions as a first display control portion 331, a second display control portion 332, a modification portion 333, a material cutout layout generating portion 334, a proposal portion 335, and an editing portion 336. It should be noted that the programs may have been recorded in a computer readable recording medium. The term "computer readable recording medium" refers to, for instance, a non-transitory storage medium such as a portable medium (a flexible disk, an optical magnetic disk, a ROM, a CD-ROM, etc.) or a storage device (a hard disk drive embedded in a computer system, etc.). The programs may be transmitted through a telecommunication line. Part of the functions is not required to be built in the server 3 and may be realized by installing additional application programs in the server 3.

Figure 5:
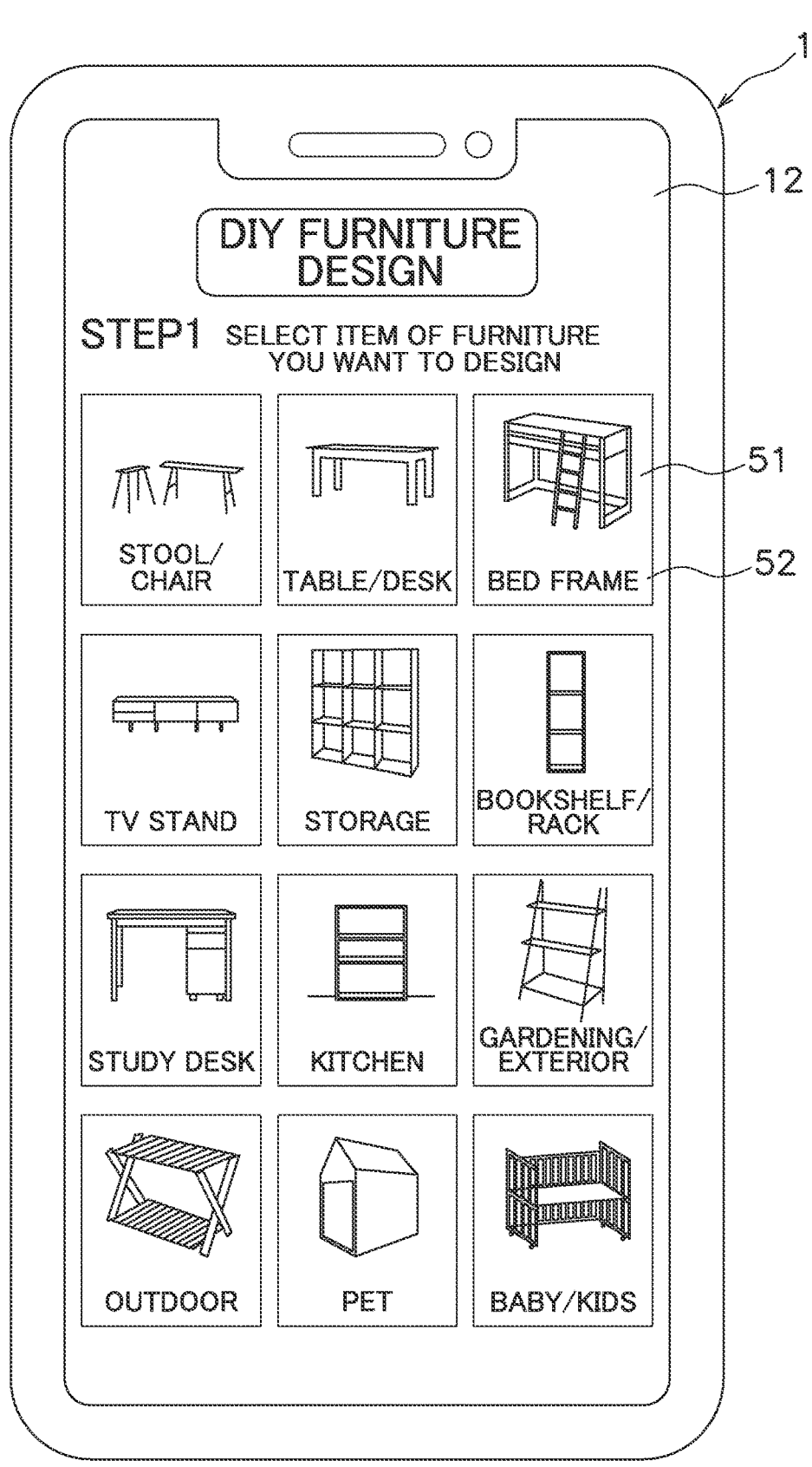
FIG. 5 is a diagram exemplifying a screen displayed on the user terminal.

The first display control portion 331 causes the display part 12 of the user terminal 1 to display a plurality of assemblies. Accordingly, as shown in FIG. 5, the plurality of assemblies are displayed on the display part 12 of the user terminal 1. It should be noted that the display part 12 simultaneously displays a thumbnail image 51 and a name 52 as an indication of each assembly. When intending to fabricate one of the assemblies, the user selects the assembly by selecting the thumbnail image 51 corresponding thereto. It should be noted that the user terminal 1 may display only the thumbnail images 51 of the assemblies, or alternatively, only the names 52 of the assemblies on the display part 12. Furthermore, the user terminal 1 may display the names of the assemblies in a pull-down menu.

Figure 6:
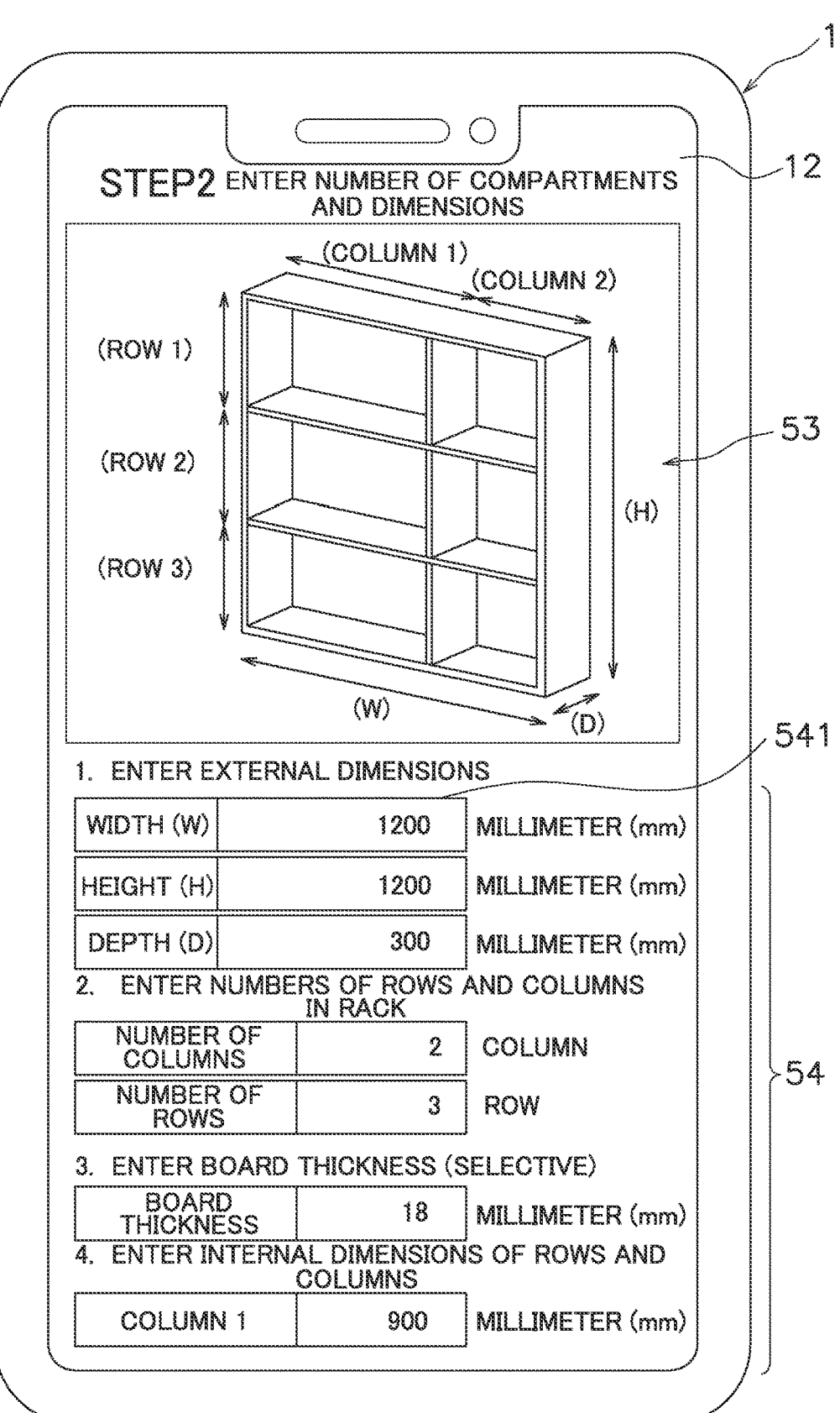
FIG. 6 is a diagram exemplifying a screen displayed on the user terminal.

The second display control portion 332 causes the user terminal 1 to display a sample image of the assembly selected by the user and an input screen for dimensions of the selected assembly. Consequently, as shown in FIG. 6, a sample image 53 of the selected assembly and an input screen 54 are simultaneously displayed on the display part 12 of the user terminal 1.

It should be noted that the sample image 53 is displayed in a perspective view. The input screen 54 is a screen for inputting the dimensions and so forth of the selected assembly. The input screen 54 includes a plurality of entry fields 541. The user fills in the entry fields 541 with dimensions, the number of compartments in a rack, and so forth. The input screen 54 includes a pull-down menu for selecting a type of material for structural members composing the assembly.

The modification portion 333 modifies the sample image 53 displayed on the user terminal 1 based on values inputted into the entry fields 541 of the input screen 54. For example, when a value, inputted into the entry field 541 related to height, is greater than the height of the sample image 53, the modification portion 333 modifies the sample image 53 so as to increase the height of the sample image 53 and causes the user terminal 1 to display the modified sample image 53.

Figure 8:
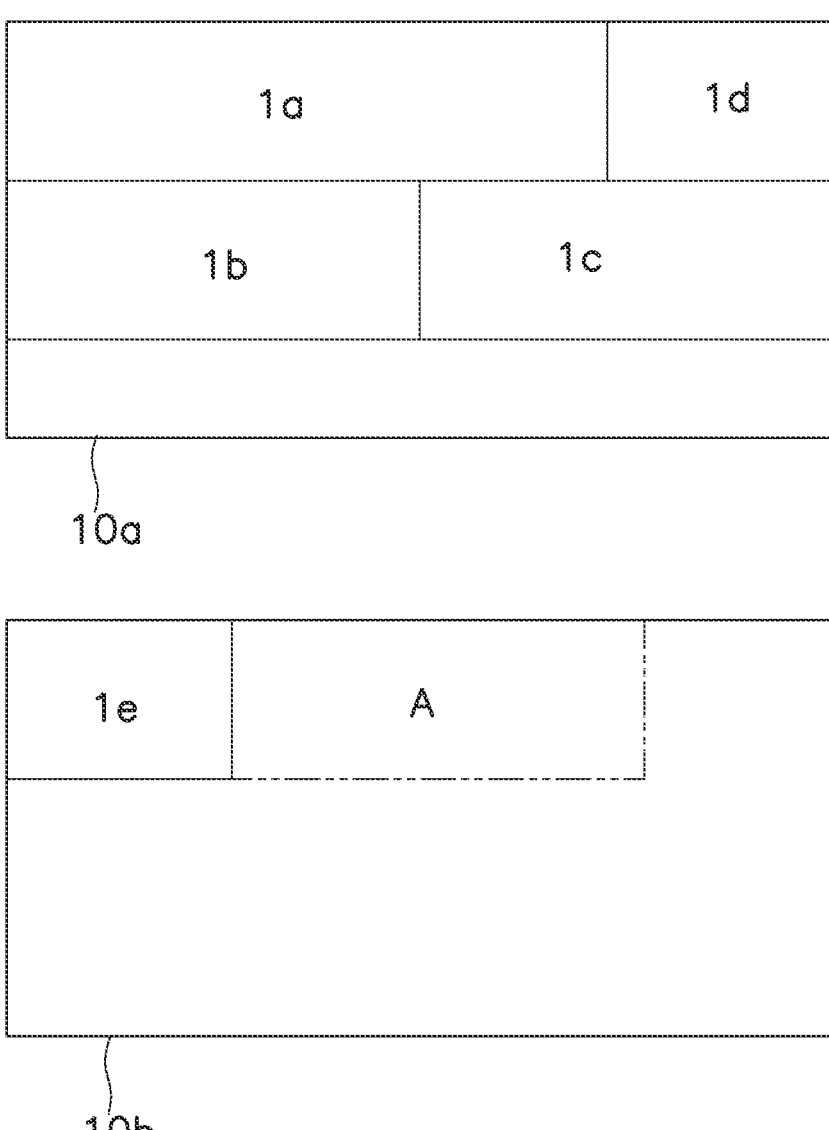
FIG. 8 is a diagram showing a material cutout layout.

The material cutout layout generating portion 334 generates a material cutout layout based on the values inputted into the entry fields 541. Then, the material cutout layout generating portion 334 causes the user terminal 1 to display the generated material cutout layout. Accordingly, such a material cutout layout as shown in FIG. 8 is displayed on the display part 12 of the user terminal 1. It should be noted that in FIG. 8, reference numerals 1a to 1e indicate members composing the assembly, respectively.

The proposal portion 335 causes the user terminal 1 to display tools, screws, metal fasteners, and so forth required for assembling the assembly. Additionally, the proposal portion 335 of the server 3 may calculate the amount of paint in accordance with the area of painting and may cause the user terminal 1 to display the amount of paint as well.

Figure 9:
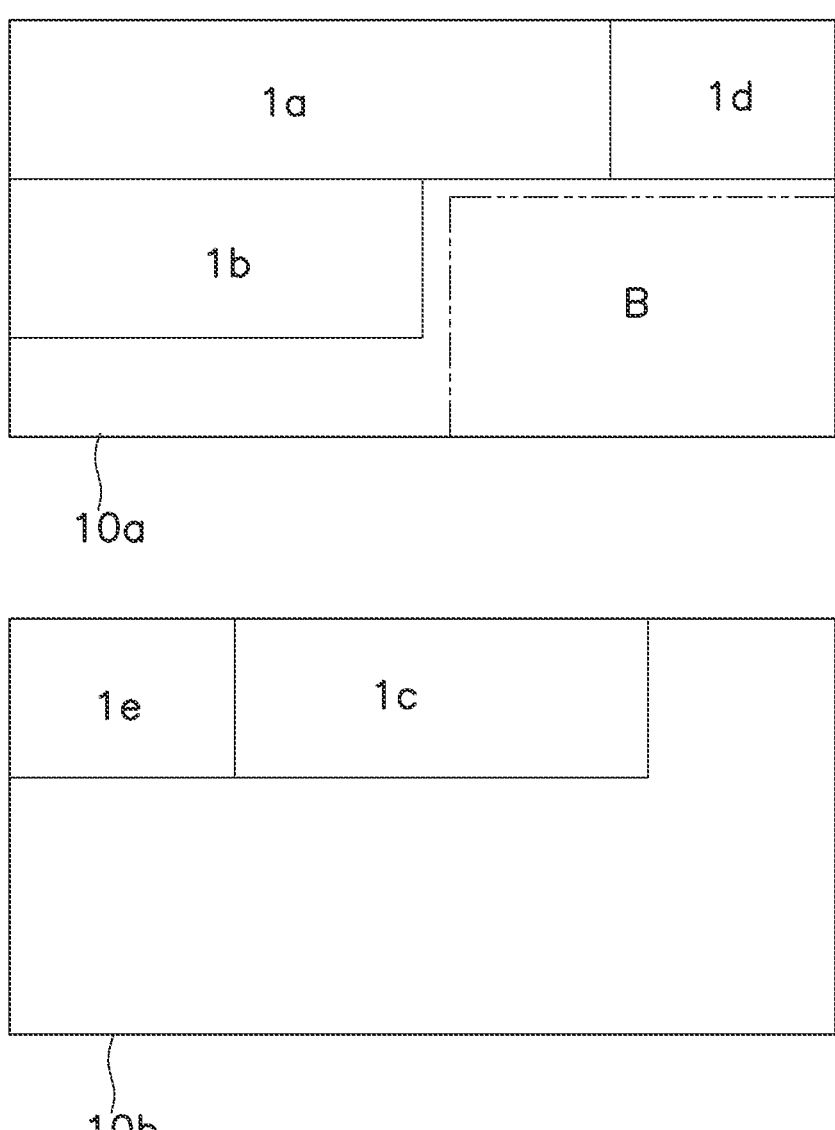
FIG. 9 is a diagram showing the material cutout layout in an edited condition.

The editing portion 336 receives an edit made by the user for the material cutout layout. For example, the user can change the material cutout layout shown in FIG. 8 into that shown in FIG. 9 by moving a member 1c to a region A depicted with dashed two-dotted line on the material cutout layout shown in FIG. 8.

Assembly Fabrication Assisting Method

Figure 10:
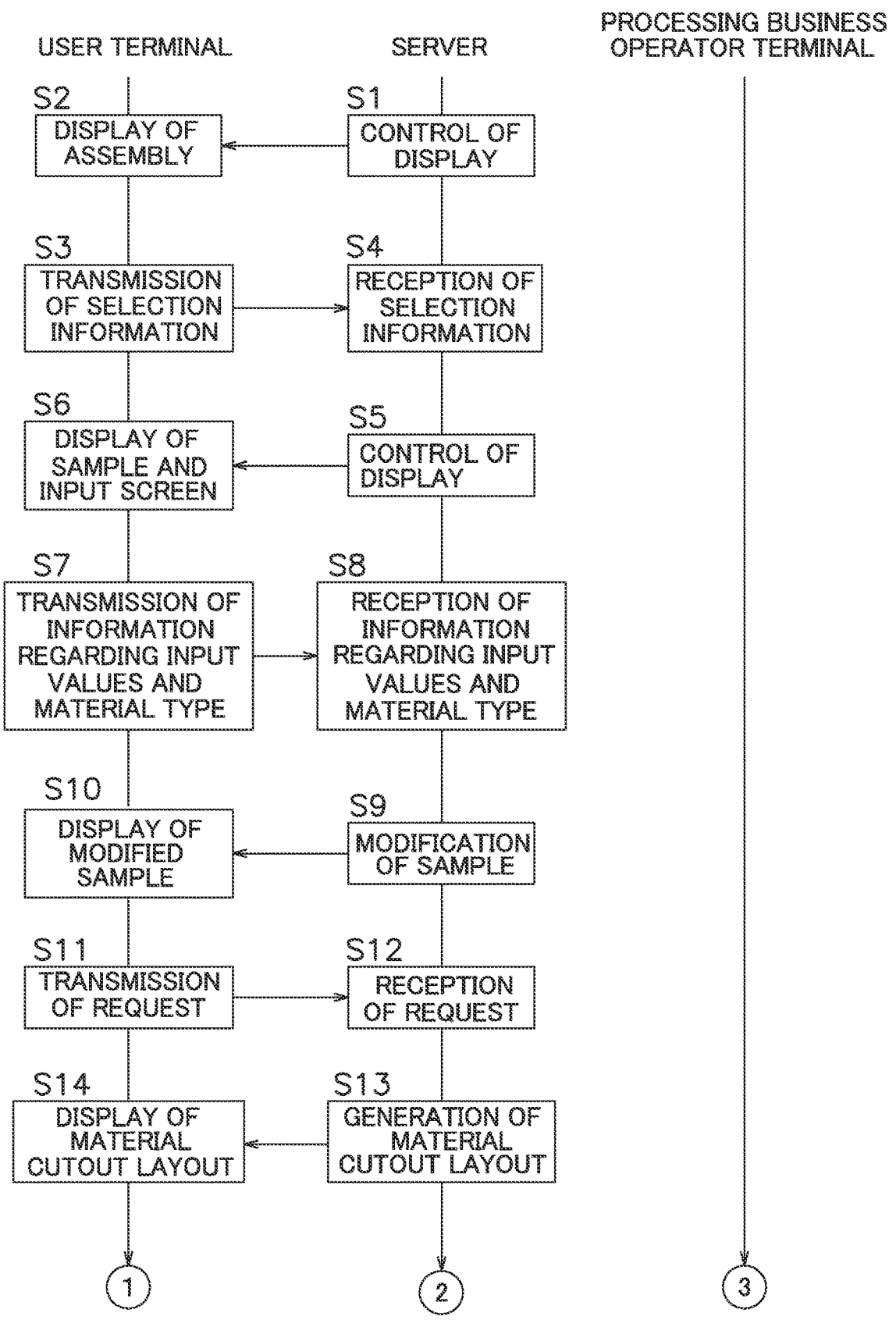
FIG. 10 is a sequence diagram showing an assembly fabrication assisting method.
Figure 11:
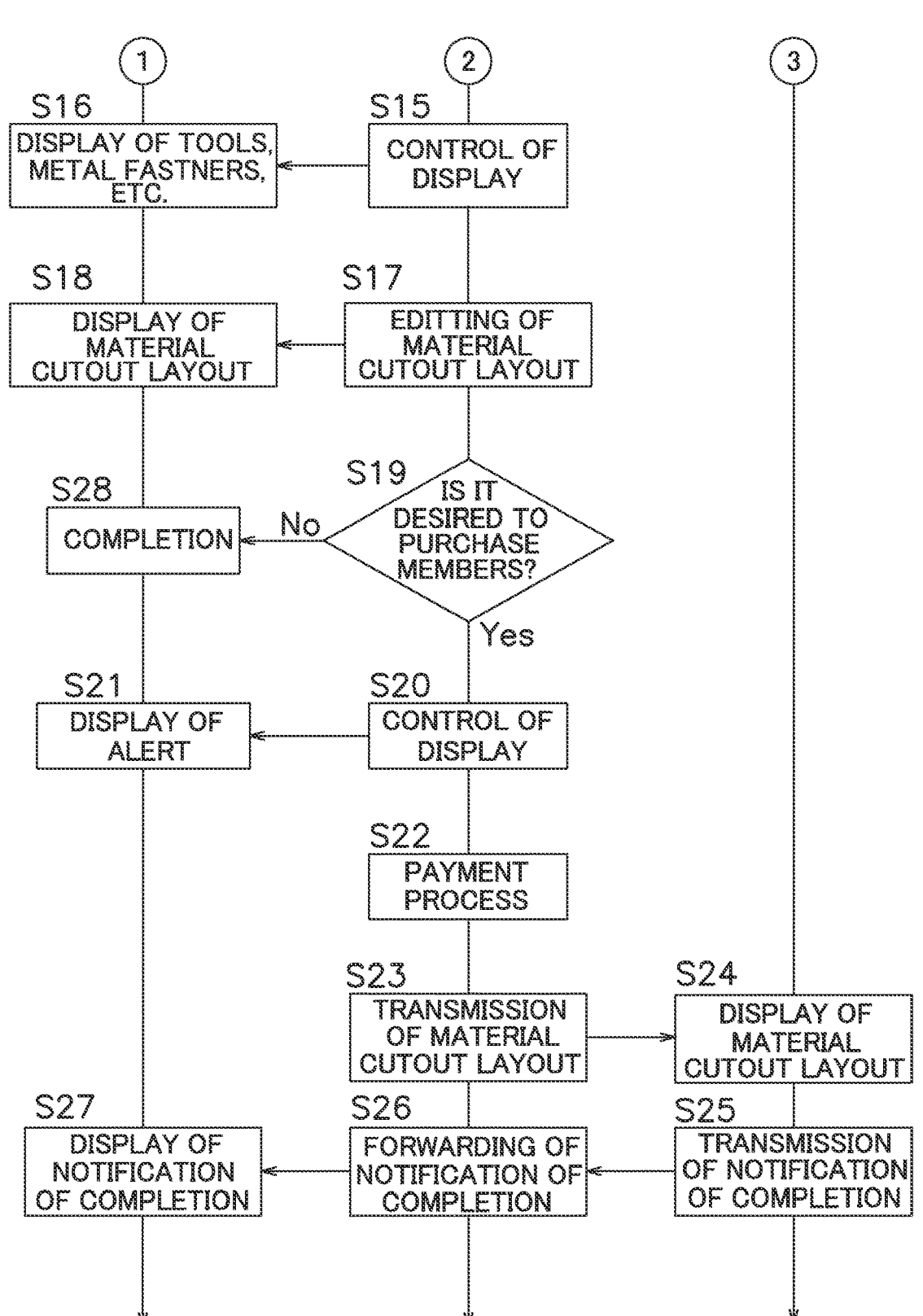
FIG. 11 is a sequence diagram showing the assembly fabrication assisting method.

An assembly fabrication assisting method will be hereinafter explained with reference to FIGS. 10 and 11. FIGS. 10 and 11 are sequence diagrams showing an assembly fabrication assisting method executed by a computer. It should be noted that the following processes are changeable in order on an as-needed basis. Also, a plurality of processes may be simultaneously executed.

As shown in FIGS. 10 and 11, in step S1, the first display control portion 331 of the server 3 causes the user terminal 1 to display a plurality of assemblies. Specifically, the first display control portion 331 transmits information of a plurality of assemblies to the user terminal 1 so as to cause the user terminal 1 to display the plurality of assemblies.

In step S2, the user terminal 1 displays the plurality of assemblies on the display part 12 based on the assembly information transmitted thereto from the server 3. Specifically, the user terminal 1 displays thumbnail images and so forth of the plurality of assemblies. FIG. 5 exemplifies a condition of the display part 12 on which the plurality of thumbnail images 51 are displayed.

In step S3, the user presses a desired one of the plurality of thumbnail images 51 of the assemblies. Accordingly, the user terminal 1 receives the operation made by the user for selecting the assembly and transmits selection information, indicating which one of the assemblies has been selected by the user, to the server 3. In step S4, the server 3 receives the selection information.

In step S5, the second display control portion 332 of the server 3 causes the user terminal 1 to display a sample of the assembly selected by the user and an input screen for dimensions of the assembly selected by the user. Specifically, the second display control portion 332 transmits the following to the user terminal 1: sample information, which is information regarding a sample, and input screen information, which is information regarding an input screen corresponding to the sample. It should be noted that a plurality of pieces of input screen information have been stored in the storage part 32, while being associated with a plurality of pieces of assembly information on a one-to-one correspondence.

When the assembly selected by the user is a type of assembly having an accommodation part (a storage rack, a bookshelf, etc.), the input screen 54 includes radio buttons, a pull-down menu, or so forth for selecting either a standard of external dimension or a standard of internal dimension. When the standard of external dimension is selected, entry fields for assembly dimensions conforming to the standard of external dimension are enabled to be filled in. Here, entry fields for assembly dimensions conforming to the standard of internal dimension may be disabled to be filled in, or alternatively, may not be displayed on the input screen 54. On the other hand, when the standard of internal dimension is selected, the entry fields for assembly dimensions conforming to the standard of internal dimension are enabled to be filled in. Here, the entry fields for assembly dimensions conforming to the standard of external dimension may be disabled to be filled in, or alternatively, may not be displayed on the input screen 54.

In step S6, the user terminal 1 displays the sample image 53 of the assembly selected by the user and the input screen 54 thereof on the display part 12 based on the sample information and the input screen information, both of which are transmitted thereto from the server 3. It should be noted that FIG. 6 exemplifies a condition of the display part 12 on which the sample image 53 and the input screen 54 are displayed.

In step S7, the user inputs dimensions into the entry fields 541 on the input screen 54. Additionally, the user selects a desired one from types of material displayed on the input screen 54 through the input part 13. For example, the desired type of material is selected from a pull-down menu. Then, the user terminal 1 transmits to the server 3 information regarding input values inputted into the entry fields 541 and information regarding the selected type of material. In step S8, the server 3 receives the input value information and the material type information.

In step S9, the modification portion 333 of the server 3 modifies the shape of the sample image 53 based on the input values. Then, the modification portion 333 causes the user terminal 1 to display the sample image 53 for which modification has been applied. In step S10, the user terminal 1 displays the modified sample 53 on the display part 12. It should be noted that the display part 12 herein displays the input screen 54 and the modified sample 53. Thus, the sample image 53 is displayed, for which modification has been applied based on the input values; hence, it is made possible for the user to intuitively design the assembly.

In step S11, when a material cutout layout button displayed on the input screen 54 is pressed by the user, the user terminal 1 transmits a request of generating a material cutout layout to the server 3. In step S12, the server 3 receives the material cutout layout generating request.

In step S13, the material cutout layout generating portion 334 of the server 3 generates a material cutout layout based on the values inputted by the user. Then, the material cutout layout generating portion 334 causes the user terminal 1 to display the material cutout layout. In step S14, the user terminal 1 displays the material cutout layout on the display part 12. FIG. 8 exemplifies the material cutout layout shown on the display part 12.

The material cutout layout generating portion 334 generates the material cutout layout such that members can be efficiently cut out from a sheet of material. The material cutout layout generating portion 334 sequentially arranges the members in an order according to length. First, the longest member is arranged on the upper left of the material cutout layout. Layout of the remaining members is performed as follows. It is determined whether or not the next member can be arranged under the arranged member. When the determination is positive, the next member is arranged under the arranged member. When the determination is negative, it is determined whether or not the next member can be arranged on the right of the arranged member. When the determination is positive, the next member is arranged on the right of the arranged member. When the determination is negative, a new material cutout layout is generated, and the next member is arranged on the upper left of the new material cutout layout. The layout processes described above are executed for each of the remaining members.

Figure 7:
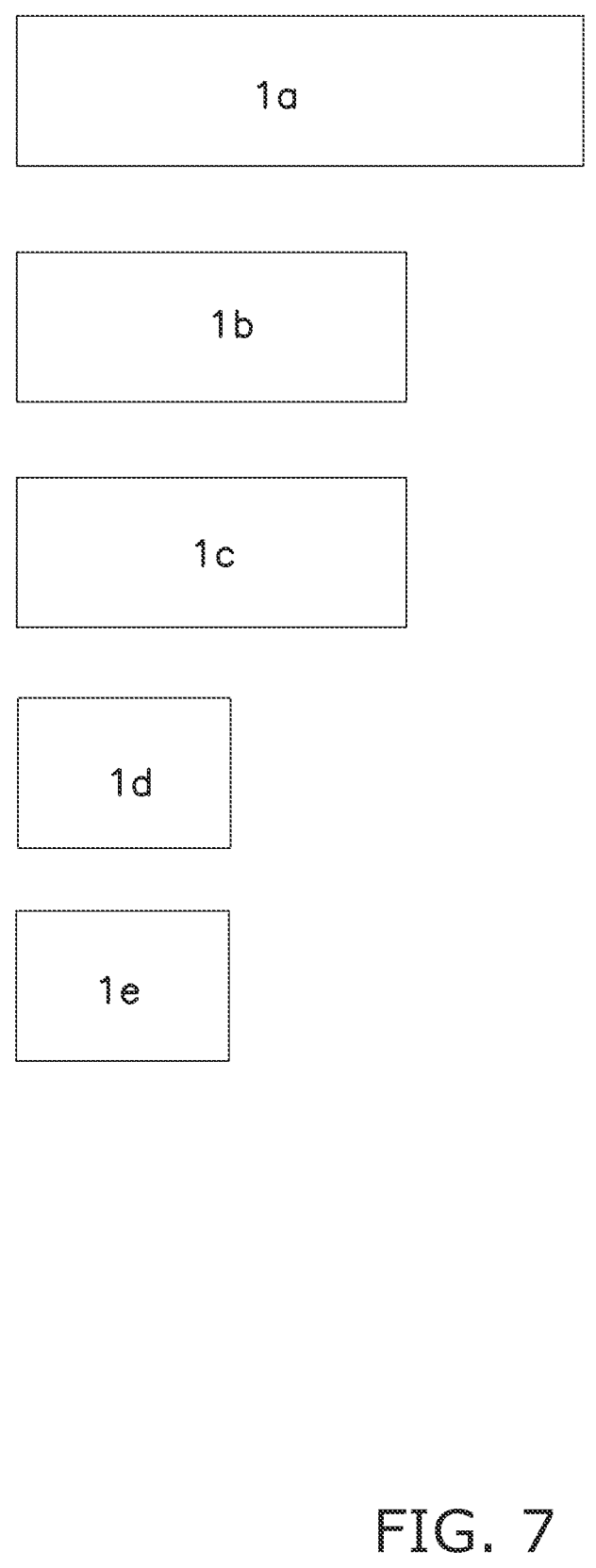

For example, in an attempt to obtain members 1a to 1e shaped as shown in FIG. 7, the material cutout layout generating portion 334 determines the layout of the members 1a to 1e in an order of 1a to 1e and generates material cutout layouts as explained below. As shown in FIG. 8, the material cutout layout generating portion 334 arranges the longest member 1a on the upper left of a base 10a generated as a material cutout layout. Next, the material cutout layout generating portion 334 determines whether or not the next member 1b can be arranged under the arranged member 1a. Here, the determination is positive; hence, the material cutout layout generating portion 334 arranges the member 1b under the member 1a. Subsequently, the material cutout layout generating portion 334 determines whether or not the next member 1c can be arranged under the arranged member 1b. Here, the determination is negative; hence, the material cutout layout generating portion 334 determines whether or not the next member 1c can be arranged on the right of the arranged member 1a. Here, the determination is negative; hence, the material cutout layout generating portion 334 then determines whether or not the member 1c can be arranged on the right of the arranged member 1b. Here, the determination is positive; hence, the material cutout layout generating portion 334 arranges the member 1c on the right of the arranged member 1b.

Next, the material cutout layout generating portion 334 determines whether or not the next member 1d can be arranged under the arranged member 1b. Here, the determination is negative; hence, the material cutout layout generating portion 334 then determines whether or not the next member 1d can be arranged on the right of the arranged member 1a. Here, the determination is positive; hence, the material cutout layout generating portion 334 arranges the member 1d on the right of the arranged member 1a. Finally, the material cutout layout generating portion 334 determines whether or not the next member 1e can be arranged under the arranged member 1b. Here, the determination is negative; hence, the material cutout layout generating portion 334 then determines whether or not the next member 1e can be arranged on the right of the arranged member 1d. Here, the determination is negative; hence, the material cutout layout generating portion 334 then determines whether or not the next member 1e can be arranged on the right of the arranged member 1c. Here, the determination is negative; hence, the material cutout layout generating portion 334 generates a base 10b as a new material cutout layout and arranges the material 1e on the upper left of the base 10b.

In step S15, the proposal portion 335 of the server 3 causes the user terminal 1 to display tools, screws, metal fasteners, and so forth required for assembling the assembly. Additionally, the proposal portion 335 of the server 3 may calculate the amount of paint in accordance with the area of painting and may cause the user terminal 1 to display the amount of paint as well. In step S16, the user terminal 1 displays the tools, the screws, fasteners, the amount of paint, and so forth required for assembling the assembly on the display part 12. It should be noted that the area of painting may be the total area of all the surfaces of members composing the assembly, or alternatively, may be the total area of one or more painting surfaces selected by the user. In the latter case, the user is enabled to select the painting surface or surfaces on the input screen 54. The proposal portion 335 of the server 3 receives the selection of the painting surface or surfaces performed by the user and calculates the area of painting based on the selected painting surface or surfaces.

The user edits the material cutout layouts displayed on the display part 12. For example, as shown in FIG. 8, the members 1a to 1e are included in the material cutout layouts. Among the members 1a to 1e, the member 1c is moved to the region A depicted with dashed two-dotted line, whereby the material cutout layouts shown in FIG. 8 are changed into those shown in FIG. 9. Accordingly, a surplus member B depicted with dashed two-dotted line in FIG. 9 can be reliably obtained. By thus editing the material cutout layouts, a surplus member, remaining after cutting out the members, can be formed in a desired shape. In step S17, the editing portion 336 of the server 3 receives an operation performed by the user for editing the material cutout layouts and edits the material cutout layouts. Then, the editing portion 336 causes the user terminal 1 to display the material cutout layouts, for which editing has been applied. In step S18, the user terminal 1 displays the material cutout layouts, for which editing has been applied.

In step S19, the server 3 receives selection made by the user regarding whether or not to purchase the members. When purchase of the members has not been selected by the user (No in step S19), the processing is completed in step S28. It should be noted that in this case, the user downloads the material cutout layouts in the form of, for instance, a pdf file.

When purchase of the members has been selected by the user (Yes in step S19), the server 3 causes the user terminal 1 to display an alert screen on the display part 12 in step S20. In step S21, the user terminal 1 displays the alert screen on the display part 12. For example, the alert screen includes the following alerts: existence of cutting errors in the members and chances of bending or cracking of the members caused when the type of material is wood. Furthermore, the server 3 generates alerts depending on the type of wood and causes the user terminal 1 to display the alerts. It should be noted that the server 3 may cause the user terminal 1 to display an important alert in emphasized manner.

In step S22, the server 3 causes the user terminal 1 to display a payment screen and executes a payment process. When completing the payment process, the server 3 transmits information regarding the material cutout layouts to the processing business operator terminal 2 in step S23.

In step S24, the processing business operator terminal 2 displays the material cutout layouts on the display part thereof. The processing business operator performs material cutting based on the material cutout layouts displayed on the display part of the processing business operator terminal 2. In step S25, when the processing business operator inputs completion of material cutting, the processing business operator terminal 2 transmits a notification indicating completion of material cutting to the server 3. In step S26, the server 3 receives the notification indicating completion of material cutting from the processing business operator terminal 2 and forwards the notification to the user terminal 1. In step S27, the user terminal 1 displays the notification indicating completion of material cutting on the display part 12 in response to an operation by the user. When confirming the notification indicating completion of material cutting, the user goes to the processing business operator (e.g., a home improvement store) to pick up the members. It should be noted that the members may not be picked up by the user, but instead, may be delivered to the user by the processing business operator.

Modifications

One preferred embodiment of the claimed invention has been described above. However, the claimed invention is not limited to the above, and a variety of changes can be made without departing from the gist of the claimed invention. It should be noted that basically speaking, respective modifications to be described are applicable simultaneously.

(a) The control part 33 of the server 3 may further execute a function as an alert generating portion. The alert generating portion alerts the user of chances of deflection of members. Specifically, in step S9 described above, the alert generating portion may cause the user terminal 1 to display not only the modified sample but also an alert. The alert generating portion of the server 3 determines whether or not to generate the alert based on input values and the type of material, both of which are inputted by the user. For example, when determining that shelf boards of a bookshelf have chances of deflection based on the thickness, length, and material type thereof inputted by the user, the alert generating portion generates the alert and transmits the alert to the user terminal 1. Then, the user terminal 1 displays the alert on the display part 12. It should be noted that, when determining that shelf boards have chances of deflection in consideration of the weight of items to be put thereon, the alert generating portion may generate the alert and transmit the alert to the user terminal 1.

(b) In the preferred embodiment described above, the processes have been explained as being executed on a web app basis, but alternatively, they may be executed on a native app basis. Specifically, the processes executed in the server 3 may be executed in the user terminal 1. In this case, the processes in steps S1 to S23 and S27 are executed in the user terminal 1. Moreover, the processes may be executed on a hybrid app basis. Specifically, the processes executed in the server 3 may be executed in part in the user terminal 1.

Figure 12:
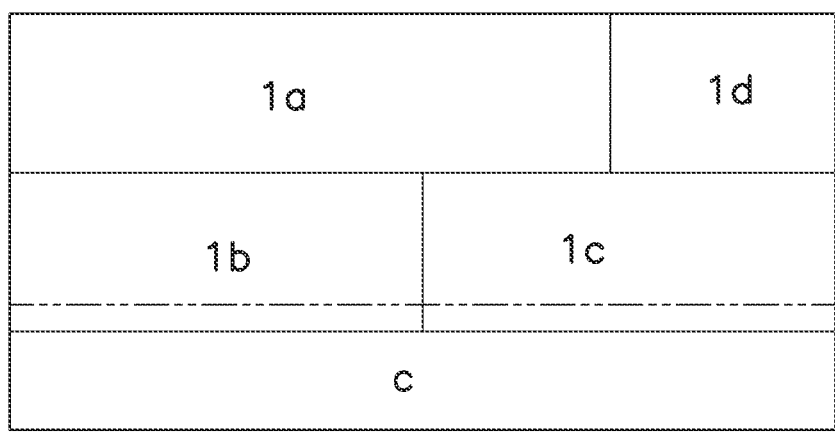
FIG. 12 is a diagram showing a material cutout layout according to a modification.
Figure 12:
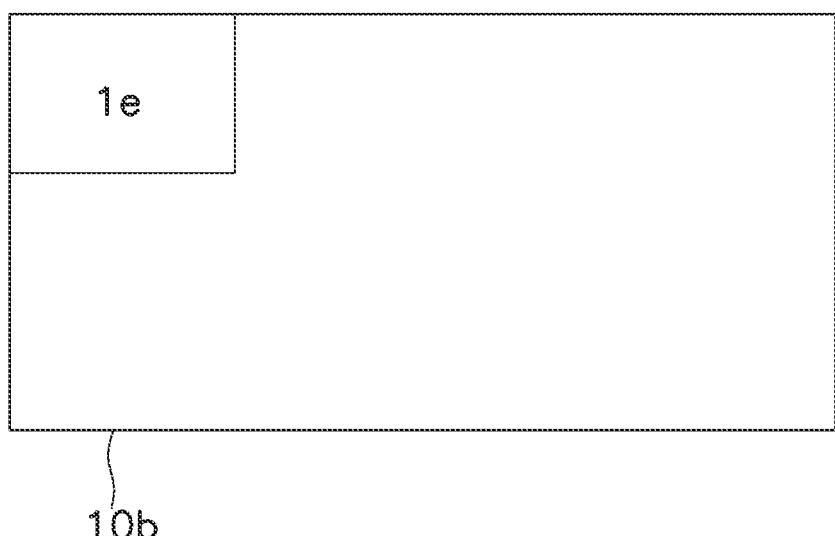

(c) The control part 33 of the server 3 may further execute a function as an input value modifying portion. The input value modifying portion may modify values inputted into the entry fields 541 based on a surplus member in the material cutout layout. For example, as shown in FIG. 12, the user operates the user terminal 1 to set a region C intended to be reliably obtained as a surplus member in the material cutout layout. The input value modifying portion receives the setting operation of the user. Then, the input value modifying portion determines whether or not to modify the input values so as to reliably obtain the region C. When determining to modify the input values, the input value modifying portion reliably obtains the region C by, for instance, modifying the input values of the members 1b and 1c so as to reduce the members 1b and 1c in size. Other than the modification herein described, when members arranged separately in two sheets of material are intended to be put together into one sheet of material, the input value modifying portion may modify the input values of the members such that the members can be put together in one sheet of material, in other words, such that the member 1e can be arranged in the material cutout layout in which the other members 1a to 1d are arranged.

Besides, the input value modifying portion receives a user request regarding modification. For example, checkboxes are herein displayed in adjacent to the entry fields on a one-to-one correspondence on the input screen. When a given one of the checkboxes is checked, the input value modifying portion receives a user request of excluding (or including) modification of the input value in the entry field adjacent to the given checkbox. Then, in accordance with the user request, the input value modifying portion does not modify the input value, for which modification has not been requested by the user, but modifies the other input values.

(d) The server 3 may transmit a manual regarding a method of fabricating an assembly selected by the user to the user terminal 1. Additionally, the server 3 may calculate the total weight of the members required to fabricate the assembly and may inform the user terminal 1 of the total weight.

LIST OF REFERENCE NUMERALS

1: User terminal, 53: Sample image, 54: Input screen, 331: First display control portion, 332: Second display control portion

I claim the following:

1. An assembly fabrication assisting method executed by a computer, the assembly fabrication assisting method comprising:

causing a user terminal to display a plurality of assemblies thereon;

receiving a selected assembly comprising one of the plurality of assemblies selected by a user;

causing the user terminal to display a sample image of the selected assembly and an input screen for dimensions of the selected assembly; and generating a material cutout layout based on an input value inputted into the input screen and causing the user terminal to display the material cutout layout.

2. The assembly fabrication assisting method according to claim 1, further comprising:

modifying the sample image displayed on the user terminal based on an input value inputted into the input screen.

3. The assembly fabrication assisting method according to claim 1, further comprising:

receiving an edit made by the user for the material cutout layout.

4. The assembly fabrication assisting method according to claim 1, further comprising:

receiving an operation performed by the user for setting a surplus member region in the material cutout layout and modifying the input value based on the surplus member region.

5. The assembly fabrication assisting method according to claim 4, further comprising:

receiving a request made by the user to modify a plurality of input values including the input value, wherein modifying the input value is executed to modify the input value in response to the request made by the user.

6. The assembly fabrication assisting method according to claim 1, wherein when the selected assembly includes an accommodation part, the input screen includes a selection button for selecting either a standard of internal dimension or a standard of external dimension.

7. An assembly fabrication assisting method executed by a computer, the assembly fabrication assisting method comprising:

causing a user terminal to display a plurality of assemblies thereon;

receiving a selected assembly comprising one of the plurality of assemblies selected by a user;

causing the user terminal to display a sample image of the selected assembly and an input screen for dimensions of the selected assembly; and calculating an amount of paint in accordance with an area of painting and causing the user terminal to display the amount of paint.

8. The assembly fabrication assisting method according to claim 1, further comprising:

transmitting to the user terminal a manual regarding a method of fabricating the one selected from the plurality of assemblies by the user.

9. The assembly fabrication assisting method according to claim 1, further comprising:

calculating a total weight of members required to fabricate the selected assembly and notifying the user terminal of the total weight.

10. An assembly fabrication assisting method executed by a computer, the assembly fabrication assisting method comprising:

causing a user terminal to display a plurality of assemblies thereon;

receiving a selected assembly comprising one of the plurality of assemblies selected by a user;

causing the user terminal to display a sample image of the selected assembly and an input screen for dimensions of the selected assembly; and transmitting data regarding a material cutout layout to a terminal belonging to a processing business operator; and transmitting a notification indicating completion of cutting of members required to fabricate the selected assembly to the user terminal in response to reception of the notification.

11. A non-transitory computer readable medium including a program causing a computer to execute the assembly fabrication assisting method recited in claim 1.

12. An assembly fabrication assisting system comprising:

a first display control portion causing a user terminal to display a plurality of assemblies;

a second display control portion causing the user terminal to display a sample image of one assembly selected by a user from among the plurality of assemblies and an input screen for dimensions of the selected assembly; and a server having a control part generating a material cutout layout based on an input value inputted into the input screen and causing the user terminal to display the material cutout layout.

* * * * *